E. F. TOWNSEND.
TRACTOR.
APPLICATION FILED JAN. 23, 1918.

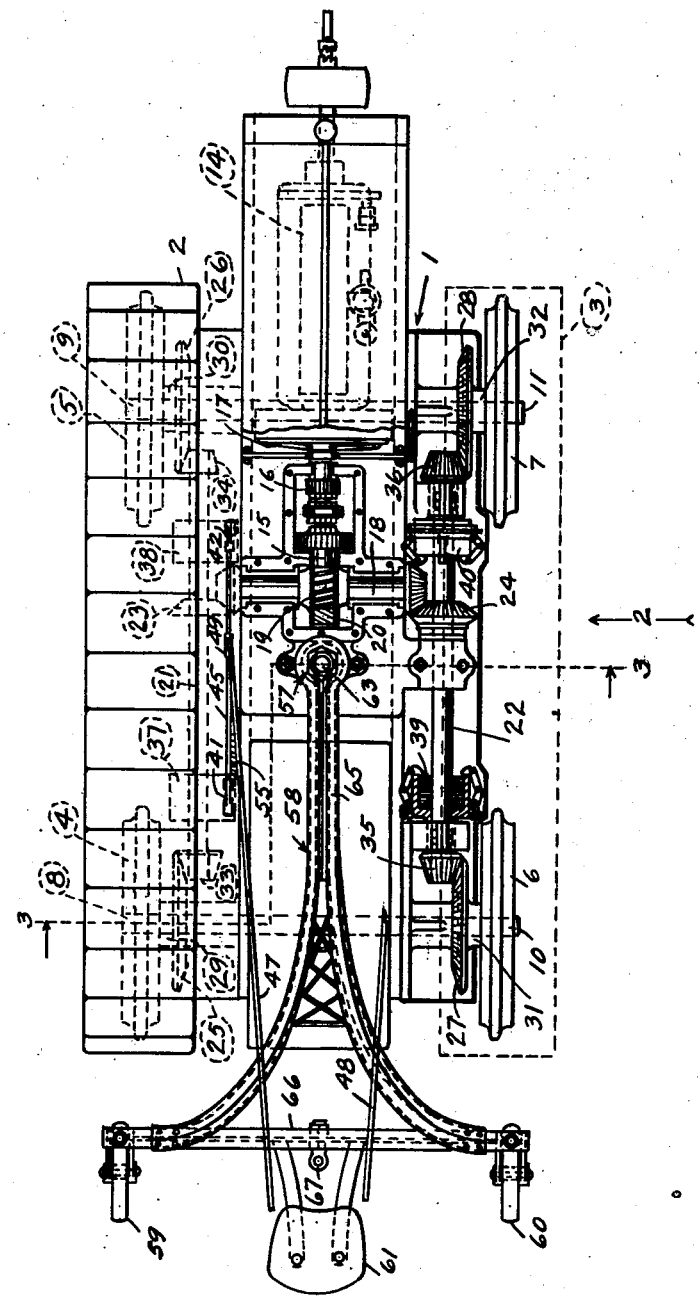

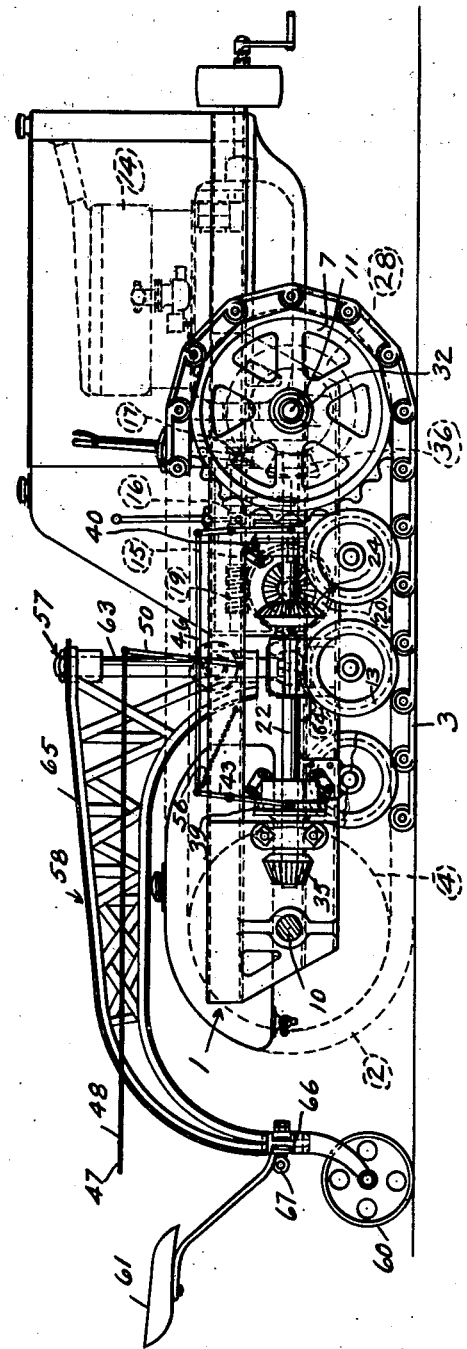

1,305,505.

Patented June 3, 1919.

Inventor:
Ernest F. Townsend,
by Hazard and Miller
Att'ys.

UNITED STATES PATENT OFFICE.

ERNEST F. TOWNSEND, OF LOS ANGELES, CALIFORNIA.

TRACTOR.

1,305,505.    Specification of Letters Patent.    Patented June 3, 1919.

Application filed January 23, 1918. Serial No. 213,313.

*To all whom it may concern:*

Be it known that I, ERNEST F. TOWNSEND, a citizen of the United States, residing at Los Angeles, in the county of Los Angeles and State of California, have invented new and useful Improvements in Tractors, of which the following is a specification.

My object is to make a tractor which may be driven with two lines like a horse, the tractor having a draft rigging connected at its plan center, so that the tractor may turn upon the center with the load standing still.

Figure 1 is a top plan view of a tractor embodying the principles of my invention, and looking downwardly, as indicated by the arrow 1 in Fig. 2.

Fig. 2 is a side elevation as indicated by the arrow 2 in Fig. 1.

Figure 4:
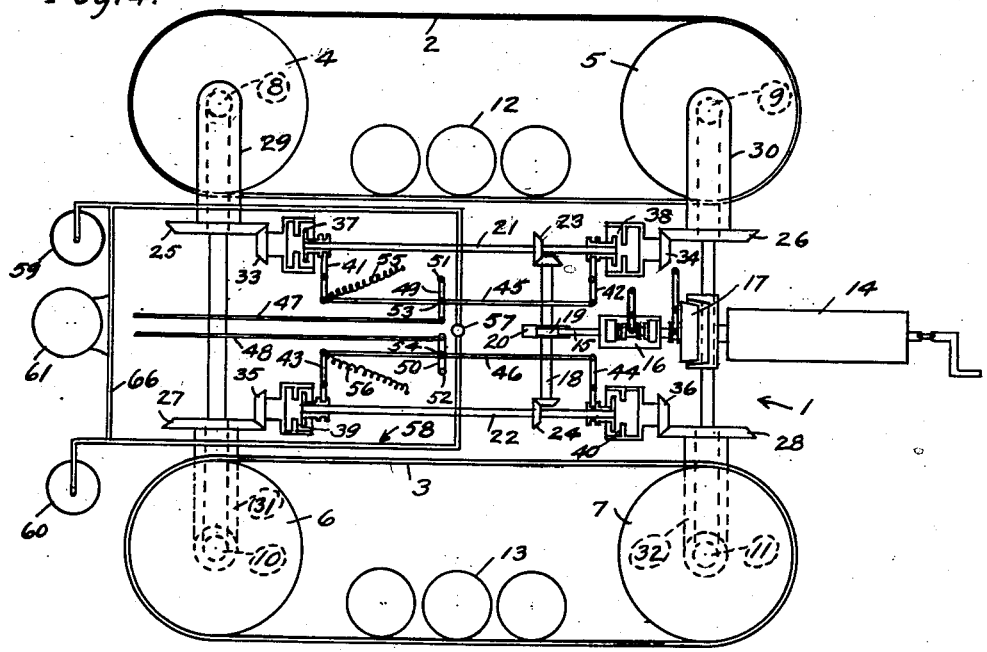
Fig. 4 is a diagrammatical plan of the operating parts, the running gear being shown in elevation.
Figure 3:
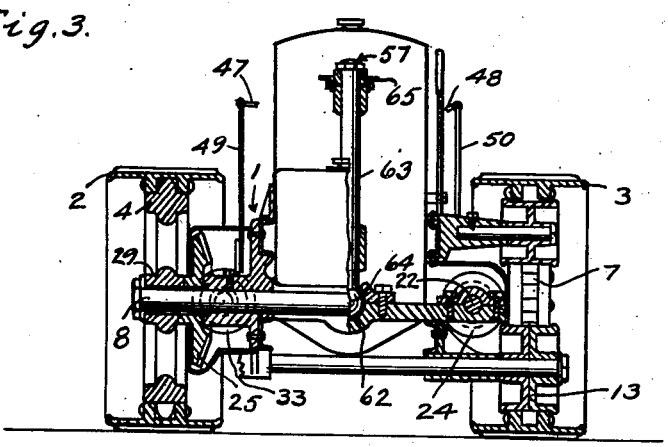
Fig. 3 is a vertical cross-section on the line 3—3 of Fig. 1.

The running gear frame 1 is rigidly constructed and is rectangular in plan and practically twice as long as it is wide. The track belt treads 2 and 3 are mounted upon opposite sides of the frame 1 and upon drivers 4, 5, 6 and 7, said drivers being mounted upon spindles 8, 9, 10 and 11, and supporting rollers 12 and 13 extend from the frame 1 between the drivers to bear upon the track treads so as to take at least some of the weight off the drivers.

The engine 14 is mounted upon the frame 1 preferably at the extreme forward end. The driving shaft 15 is connected to the engine 14 through the speed change 16 and the clutch 17 and the driving shaft 15 is connected to the distributing shaft 18 by a worm 19 meshing with a gear 20. The countershaft 21 is parallel with the track belt tread 2, and the countershaft 22 is parallel with the track belt tread 3, and the ends of the distributing shaft 18 are connected to the shafts 21 and 22 by pairs of bevel gears 23 and 24.

The drivers 4, 5, 6 and 7 are mounted loosely upon the spindles 8, 9, 10 and 11, and bevel gears 25, 26, 27 and 28 are rigidly fixed upon the hubs 29, 30, 31 and 32 of the drivers 4, 5, 6 and 7. Bevel gears 33, 34, 35 and 36 are mounted in mesh with the gears 25, 26, 27 and 28 and are independently connected to the countershafts 21 and 22 by clutch mechanisms 37, 38, 39 and 40. Clutch levers 41, 42, 43 and 44 operate the clutches 37, 38, 39 and 40. The clutch levers 41 and 42 are preferably connected together by a link 45 so as to be simultaneously operated, and the clutch levers 43 and 44 are connected by a link 46 so as to simultaneously operate the levers 43 and 44. When the levers 41, 42, 43 and 44 stand vertical, all the clutches are disconnected and the engine may run with the clutch 17 connected and the transmission 16 in high or low, driving the shaft 15, the gears 19 and 20, the distributing shaft 18, and the countershafts 21 and 22 continuously, with all four drivers 4, 5, 6 and 7 disconnected and the tractor standing still.

The lines 47 and 48 are connected to line levers 49 and 50 and the line levers are pivotally connected to rigid parts of the frame by pivots 51 and 52 and connected to the links 45 and 46 by pivots 53 and 54. Retractile coil springs 55 and 56 are connected to the frame and to the clutch operating mechanism so that the tension of the springs will be exerted to set the clutches 37 and 39 and drive the machine forwardly. As shown in Fig. 4 the springs 55 and 56 are connected to the levers 41 and 43, but it is obvious that the springs may be connected to the links 45 and 46 and that the springs may be set to hold the clutches in neutral or to set the clutches 38 and 40 and drive the machine backward.

The draft rigging pivot 57 is at the plan center of the running gear frame 1 and the draft rigging 58 is connected to this pivot and extends upwardly and backwardly and rests upon the draft rigging wheels 59 and 60. The operator's seat 61 is mounted upon the draft rigging 58 and the operator holds the rear ends of the lines 47 and 48 in a manner similar to driving a horse.

The details of the draft rigging 58 are as follows: A ball socket 62 is formed in the frame 1 and practically at the plan center of the frame. A post 63 is vertically mounted and has a ball 64 upon its lower end fitting in the socket 62. The tongue 65 is fixed upon the post and extends backwardly in a plane above the frame 1 and to a position beyond the rear end of the frame 1 and then downwardly. The cross-head 66 is fixed to the rear end of the tongue 65, and the caster wheels 59 and 60 are operatively mounted under the ends of the cross-head 66. The eye-bolt 67 is fixed horizontally and longitudinally through the cross-head 66 at the transverse center of the tractor, and the trailer or machine to be drawn may be attached to this eye-bolt. The caster wheels 59 and 60 are far enough behind the running gear to allow the running gear to turn freely upon the ball and socket joint to any desired extent in either direction.

The operation is practically as follows: The lines 47 and 48 should be tied to the seat 61 so as to told the clutches 37, 38, 39 and 40 all in neutral. The operator starts the engine 14, the transmission gearing 16 is set to the desired speed, the clutch 17 connected, and then the operator gets upon the seat 61 and manipulates the lines 47 and 48. In order to go straight ahead the operator will release the lines to set the clutches 37 and 39. In order to go straight backwardly the lines 47 and 48 will be pulled and the springs 55 and 56 will set the clutches 38 and 40. In order to turn, one line will be pulled to set the reverse clutch and the other line will be released to set the straight ahead clutch. Then one track tread belt may move one way and the other the other way and the running gear will turn upon its plan center. In turning in either direction, diagonal drivers will operate. If the line 48 is pulled and the line 47 released, the driver 4 will drive ahead and the driver 7 will drive backwardly, and if the line 47 is pulled and the line 48 released the operation is reversed, the driver 6 driving ahead and the driver 5 driving backwardly. In this way the tractor is handled by manipulating a pair of lines 47 and 48 in a manner similar to driving a horse.

By the use of four independent drivers the track belt treads are always driven from the rear ends of the portions contacting with the ground thereby keeping the contacting portions in tension and avoiding all liability of their buckling up between the supporting rollers as would be the case if they were driven forwardly and backwardly by the same driver. In other words, I use two independent drivers for a track belt tread and operate one driver to go ahead and the other driver to reverse instead of gearing the drivers together and operating them simultaneously to go ahead or reverse.

There is a great advantage in connecting the draft rigging to the plan center of the frame instead of connecting it to the tail end of the frame for the reason that when the tractor turns upon its plan center, one end swings one way and the other end the other, whereas if the draft rigging were connected to the rear end of the frame it would be impossible to swing the rear end of the frame one way or the other.

Various changes may be made in the details of construction without departing from the spirit of my invention as claimed.

I claim:

1. A tractor comprising a running gear having two track belt treads; each tread having two drivers one at each end; supporting rollers running on the treads between the drivers, a power plant for operating the drivers, two lines for controlling the connections between the power plant and the drivers; so that by manipulating the lines the drivers may be operated to go forwardly or backwardly or in opposite directions; and a draft rigging pivotally connected to the plan center of the running gear.

2. A tractor comprising a running gear having two track belt treads; each tread having two drivers one at each end; supporting rollers running on the treads between the drivers, a power plant for operating the drivers, two lines for controlling the connections between the power plant and the drivers; so that by manipulating the lines the drivers may be operated to go forwardly or backwardly or in opposite directions; a draft rigging pivotally connected to the plan center of the running gear, and traction wheels supporting the rear end of the draft rigging.

3. A tractor comprising a running gear having two track belt treads, each tread having two drivers one at each end, clutches for the drivers, connections between the two clutches of each tread so that when one clutch is connected the other is disconnected, springs connected to the connections to hold corresponding clutches connected and drive the tractor one way, and lines attached to the connections for overcoming the springs and connecting the other clutches to drive the tractor the other way.

4. In a tractor, a track belt tread having two drivers, clutches for the drivers, a connection between the clutches, a spring attached to the connection to hold one clutch connected while the other is disconnected, and a line attached to the connection for overcoming the spring and disconnecting the first clutch and connecting the second clutch.

5. A tractor comprising a running gear having two track belt treads, each tread having two drivers one at each end, a power plant for operating the drivers, two lines for controlling the connections between the power plant and the drivers, and a draft rigging pivotally connected to the plan center of the running gear.

6. A tractor comprising a running gear having two track belt treads, each tread having a driver at each end, clutches for the drivers, yielding means for holding the clutches driving one way connected and the clutches driving the other way disconnected, and lines for disconnecting the first clutches and connecting the second clutches.

7. A tractor comprising a running gear having two track belt treads, each tread having a driver at each end, and means for optionally operating the forward drivers to move the tractor one way and the rear drivers to move the tractor the other way.

8. In a tractor a track belt tread, a driver at each end of the tread, and means for optionally operating one driver to move the tractor one way and the other driver to move the tractor the other way.

In testimony whereof I have signed my name to this specification.

ERNEST F. TOWNSEND.